Oct. 6, 1953  J. G. OETZEL  2,654,445
FRICTION DEVICE
Filed March 2, 1949
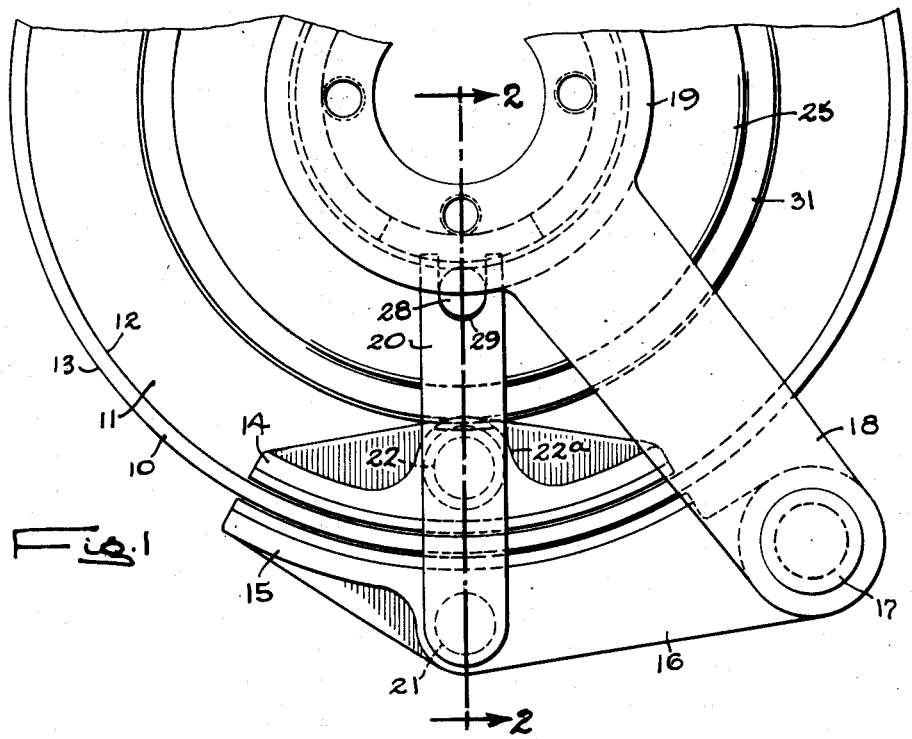
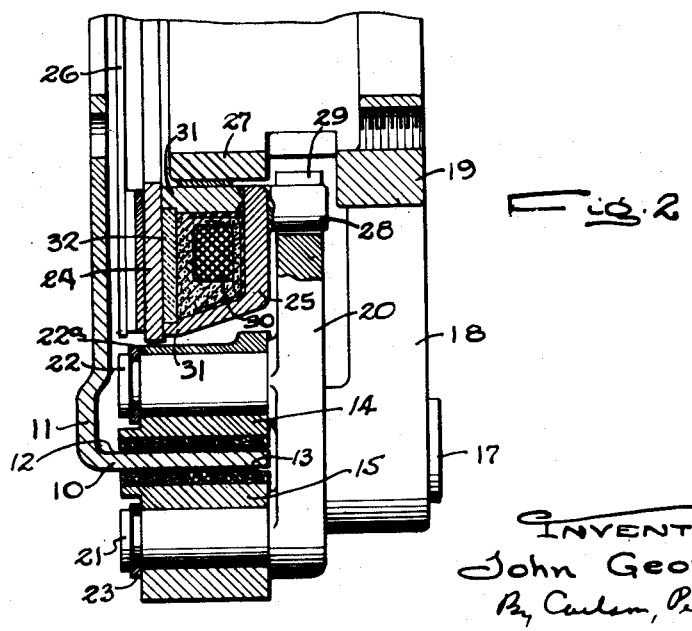
INVENTOR
John George Oetzel
By Curlan, Pitzner, Hetznik & Wolfe
ATTORNEY Patented Oct. 6, 1953

2,654,445

UNITED STATES PATENT OFFICE 2,654,445

FRICTION DEVICE

John George Oetzel, Beloit, Wis., assignor to Warner Electric Brake & Clutch Company, a corporation of Illinois Application March 2, 1949, Serial No. 79,253

5 Claims. (Cl. 188—76)

This invention relates to friction brakes and clutches and has more particular reference to those of the type having friction shoes movable simultaneously into engagement with the inner and outer peripheral surfaces of a rotary drum which forms one of the clutch or brake elements.

The primary object is to provide for actuation of a clutch or brake of the above character by a power actuator disposed within the drum structure and movable in an arcuate path about the drum axis.

Another object is to adapt the actuator for engagement of the friction elements by motion in either direction away from a normal released position.

Other objects and advantages of the invention will become apparent from the following detailed description taken in connection with the accompanying drawings, in which Figure 1 is a fragmentary elevational view of a friction device embodying the novel features of the present invention.

Fig. 2 is a section taken along line 2—2 of Fig. 1.

In the drawings, the invention is shown incorporated in a brake especially adapted for use on road vehicles and comprising generally a drum 10 projecting axially from a mounting flange 11 and having internal and external cylindrical surfaces 12 and 13 respectively engageable with arcuate shoes 14 and 15. The latter are covered with layers of wear-resistant friction material which conforms to the curvature of the coacting drum surfaces and is approximately as wide as the drum surfaces. The mounting flange may be secured in any suitable manner to a vehicle wheel with the drum concentric with the wheel axis.

One of the shoes, in this instance the outer shoe 15, is anchored against circumferential movement relative to the drum while being free to swing into gripping engagement with the latter. For this purpose, a flange section 16 is formed along the outer side of the shoe and beyond the shoe end is connected by a pivot pin 17 to the outer end of an arm 18 projecting radially from an anchor member or hub 19 bolted or otherwise secured to a nonrotatable part of the vehicle. The arm is spaced axially a short distance from the drum end and extends across the latter adjacent the shoe ends.

The shoes are moved simultaneously into engagement with the drum by swinging of an elongated lever 20 away from a normal brake release position in which the lever is disposed substantially radially as shown in Fig. 1 and projects across the drum end substantially at the centers of the shoes. A stud 21 rigid with the outer end of the lever projects laterally therefrom and through the shoe flange 16 which is held on the stud by a snap ring 23 or the like. A similar stud 22 formed on the lever within the drum projects through a boss 22a on the inner side of the inner shoe 14. The spacing of the studs 21 and 22 is such that when the lever is disposed radially as shown in Fig. 1, the friction surfaces of both shoes will clear the drum surfaces and the brake will be released. When the lever is swung in either direction away from this released position, the radial spacing of the studs will be reduced and both shoes will be pressed into engagement with their coacting drum surfaces. In this motion, the lever fulcrums about the stud 21 which, through the medium of the shoe 15, is held against circumferential displacement by the anchor member 18. Since both shoes are pivotally mounted, their friction faces will come into full engagement with the drum surfaces.

In accordance with the present invention, such swinging of the lever 20 is effected by a power actuator which preferably is disposed within the drum and includes a part movable transversely across the inner end of the lever to which the part is pivotally connected. Herein, the actuator is of the type which derives an actuating force of the desired magnitude from the kinetic energy of the moving parts by axial gripping engagement of two friction elements, one of which rotates with the drum. One of these elements is a generally flat ring 24 concentric with the drum axis and supported for axial floating movement from the drum flange 11 as by a plurality of tangentially extending spring arms 26, being urged by these arms into light mechanical contact with the friction face of the other element.

Preferably, the latter element is a ring 25 journaled in the plane of the shoes on a hub extension 27 of the anchor member 19 adjacent the inner end portion of the lever 20, the ring thus being adapted for oscillation back and forth about the drum axis. A lug 28 rigid with the back of the ring 25 projects through a slot 29 in the inner end of the lever 20 and remains in this slot in all positions of the lever.

While the friction rings may be brought into axial gripping engagement in various ways, this is best accomplished by magnetic action. For this purpose, the ring 24 constitutes the armature of a magnet formed by the ring 25 and having an annular winding 30 which may be energized to varying degrees according to the braking action desired. Herein, the ring 25 is made of U-shape cross section with the winding disposed between two concentric pole pieces 31 which support and are flush with the outer face of a non-magnetic wear plate 32.

When the winding 30 is energized with the drum rotating and the parts disposed in brake released position as shown in Fig. 1, the magnet ring 25 is drawn into gripping engagement with the rotating armature 24 and thus turns with the latter, swinging the inner end of the lever 20 in the direction of rotation of the drum. In this movement, the lever pivots about the stud 21 and the resulting reduction in radial spacing of the studs 21 and 22 moves both of the shoes into gripping engagement with the drum surfaces under a pressure which is determined by the degree of energization of the magnet. When both of the shoes are in full engagement with the drum surfaces, the motion of the magnet ring is arrested as permitted by slippage between the clutch rings, the brake being held applied so long as the energization of the magnet is continued. When the magnet is deenergized, the parts are allowed to move back to release position.

Application of the brake when the drum is rotating in the reverse direction takes place in the same way. In this case, however, the inner end of the lever 20 is moved away from brake release position in the other direction following the direction of drum rotation.

In the brake above described, it will be apparent that all of the parts of the power actuator are disposed within the drum and compactly arranged. At the same time, the lever 20 is made of substantial length so that the actuating force derived by engagement of the friction clutch is applied to the brake shoes at a substantial mechanical advantage.

I claim as my invention:

1. A friction device having, in combination, a rotatable cylindrical drum, two arcuate friction shoes engageable with the inner and outer peripheral surfaces of said drum, a rigid lever normally projecting radially across the end of said drum and inwardly beyond the inner shoe, parallel studs rigid with and projecting laterally from said lever parallel to the drum axis and pivotally connected to the respective shoes intermediate the ends of the latter, an anchor pivotally connected to one of said shoes to hold the latter against turning about the drum axis while permitting rocking of the shoe into and out of engagement with the drum, an actuator within said drum movable in an arcuate path about the drum axis, and means connecting said actuator and the inner end of said lever for rocking of the latter out of its normal position in response to movement of the actuator along said path.

2. A friction device having, in combination, a rotatable cylindrical drum, two arcuate friction shoes engageable with the inner and outer peripheral surfaces of said drum, a rigid lever projecting radially across said drum, parallel studs rigid with and projecting laterally from said lever parallel to the drum axis and pivotally connected to the respective shoes intermediate the ends of the latter, an anchor pivotally connected to one of said shoes at a point circumferentially spaced from said studs, an actuator within said drum movable in an arcuate path about the drum axis, and means connecting said actuator and the inner end of said lever for rocking of the latter out of its normal radial position in response to movement of the actuator along said path in either direction away from a normal released position.

3. A friction device having, in combination, a rotatable cylindrical drum, two friction shoes engageable with the inner and outer peripheral surfaces of said drum, a rigid lever projecting radially across one end of said drum, parallel studs rigid with and projecting laterally from said lever parallel to the drum axis and pivotally connected to the respective shoes, an anchor connected to one of said shoes to hold the latter against turning about the drum axis while permitting rocking of the shoe into and out of engagement with the drum, an actuator movable in an arcuate path about the drum axis and within said inner shoe, and means connecting said actuator and the inner end of said lever for rocking of the latter out of its normal position in response to movement of the actuator along said path whereby to swing the lever about one of said studs and thereby bring both of the shoes into gripping engagement with the drum.

4. A friction device having, in combination, a rotatable cylindrical drum, two friction shoes engageable with the inner and outer peripheral surfaces of said drum, a lever projecting radially across the end of said drum and inwardly beyond the inner shoe and pivotally connected to each of the shoes, an anchor connected to one of said shoes to hold the latter against turning about the drum axis while permitting rocking of the shoe into engagement with the drum, and an actuator within said drum movably connected to the inner end of said lever and movable to rock the latter out of its normal radial position and thereby bring both of said shoes into gripping engagement with the drum.

5. A friction device having, in combination, a rotatable cylindrical drum, two friction shoes engageable with the inner and outer peripheral surfaces of said drum, a lever projecting across the end of said drum and inwardly beyond the inner shoe and pivotally connected to each of the shoes, an anchor connected to one of said shoes to hold the latter against turning about the drum axis while permittting rocking of the shoe into engagement with the drum, a pair of axiallly engageable friction rings disposed within said drum, one ring being rotatable with the drum and the other being mounted for oscillation about the drum axis and connected to said lever, and means by which said rings may be brought into axial gripping engagement under varying degrees of pressure.

JOHN GEORGE OETZEL.

References Cited in the file of this patent

UNITED STATES PATENTS

| Number | Name | Date |
|---|---|---|
| 1,646,932 | Rosenberg | Oct. 25, 1927 |
| 2,106,717 | Cadman | Feb. 1, 1938 |
| 2,265,578 | Rosenberg | Dec. 9, 1941 |
| 2,353,750 | Oetzel | July 18, 1944 |